Aug. 19, 1941.   C. A. BALTON   2,252,914
DIESEL ENGINE
Filed Sept. 11, 1939   12 Sheets-Sheet 4

INVENTOR
Charles A. Balton
Mason & Porter
ATTORNEYS

Aug. 19, 1941.  C. A. BALTON  2,252,914

DIESEL ENGINE

Filed Sept. 11, 1939  12 Sheets—Sheet 6

INVENTOR
Charles A. Balton
By Mason & Porter
ATTORNEYS

Aug. 19, 1941.   C. A. BALTON   2,252,914
DIESEL ENGINE
Filed Sept. 11, 1939   12 Sheets-Sheet 7
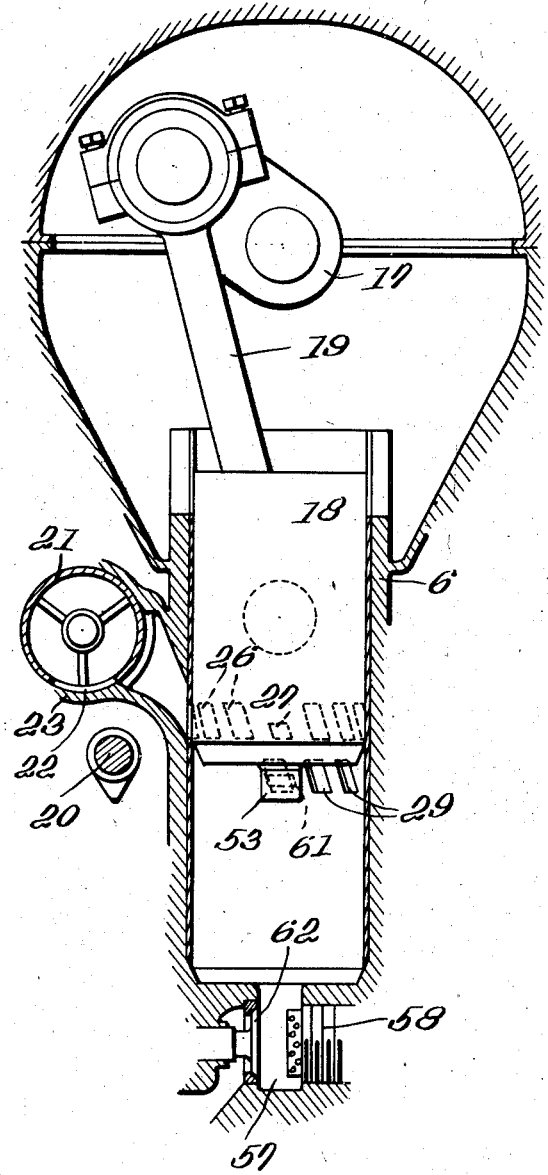
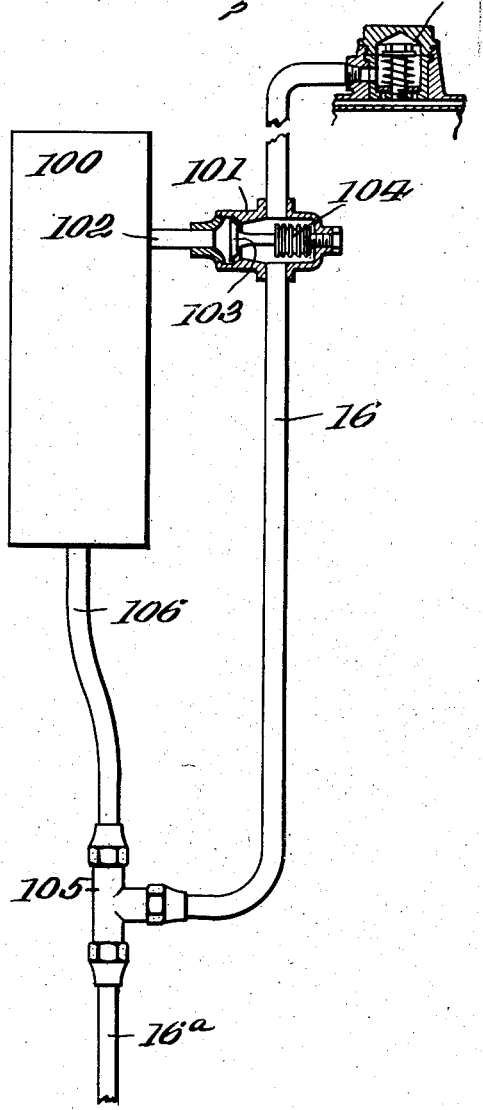
INVENTOR
Charles A. Balton
Mason & Porter
ATTORNEYS

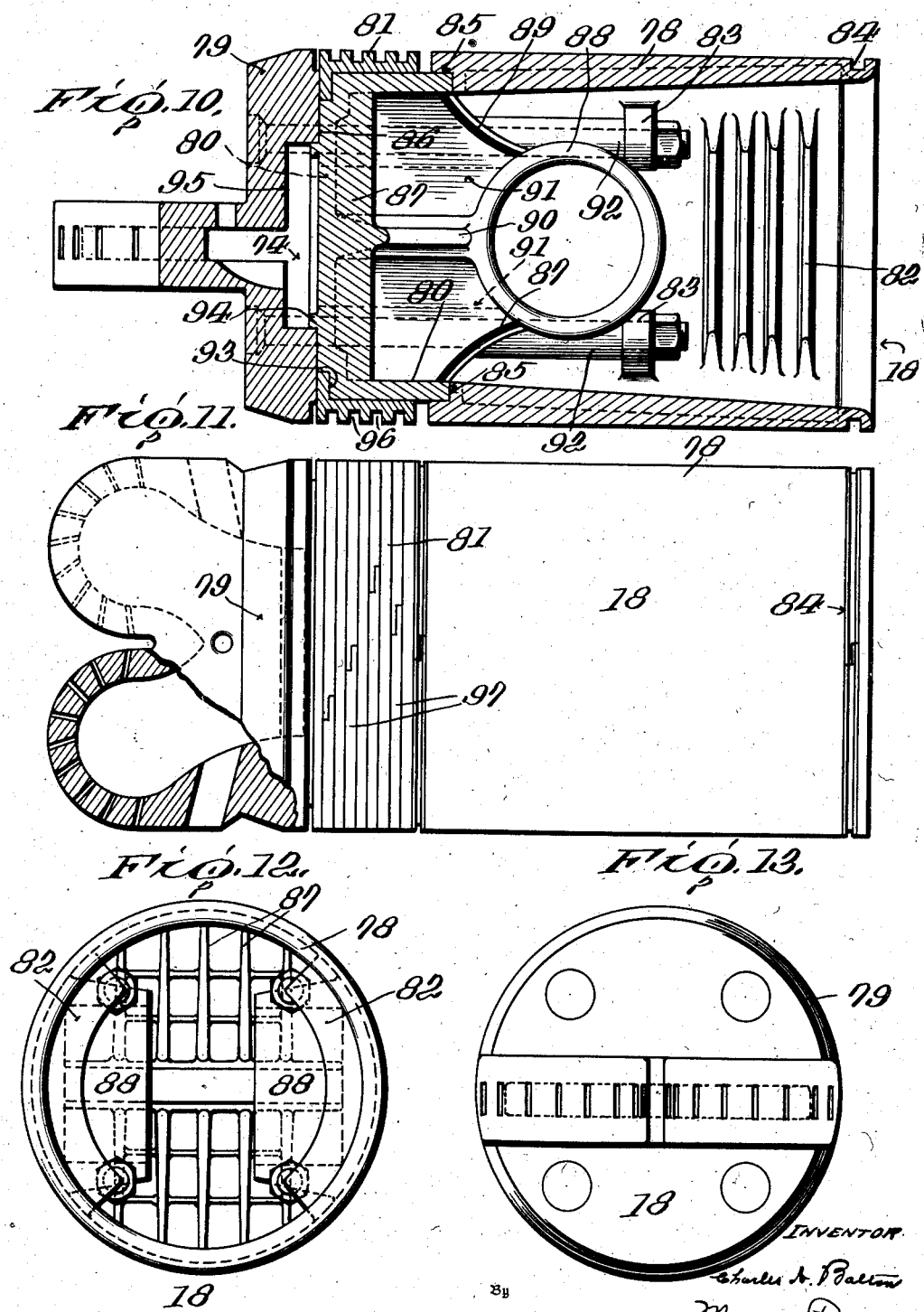

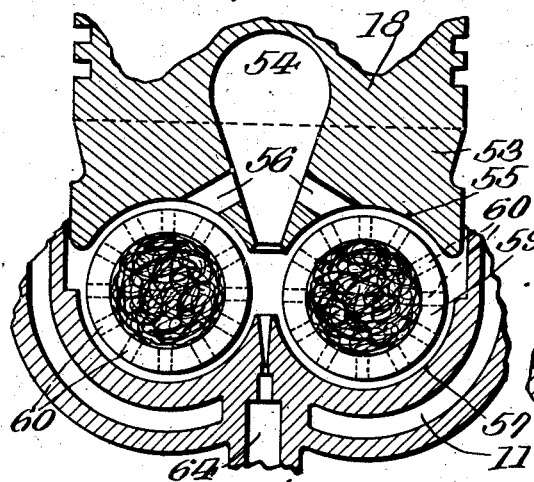
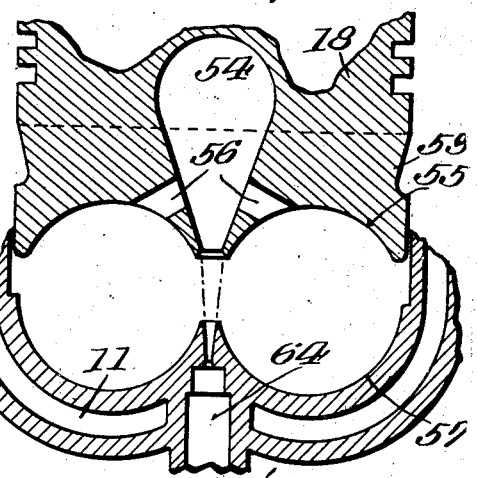
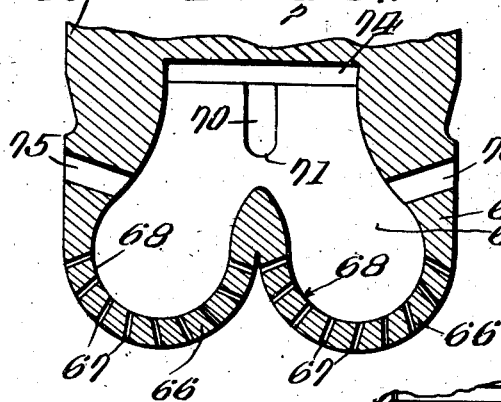
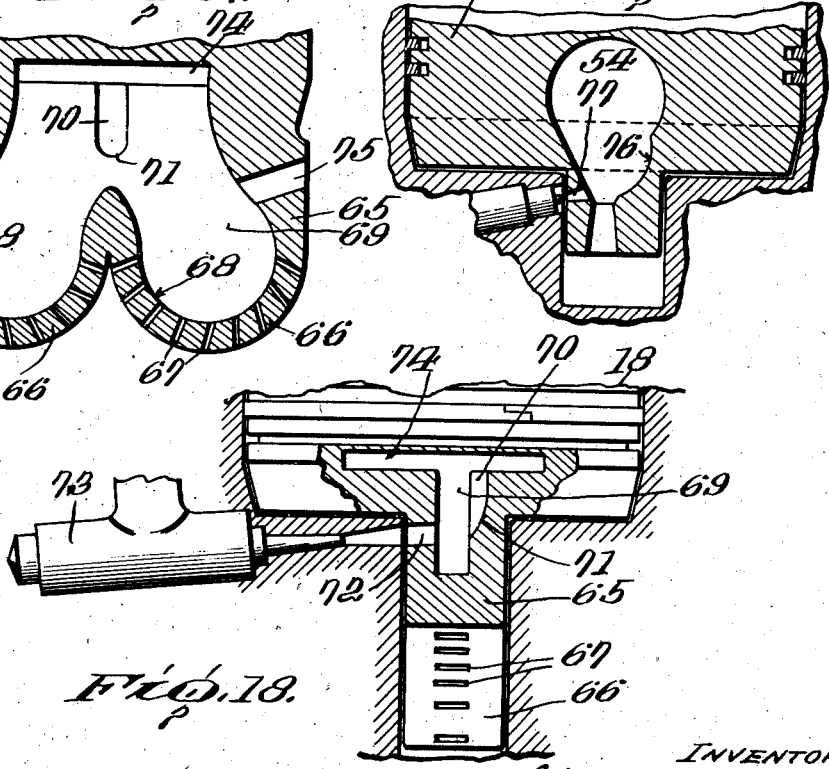

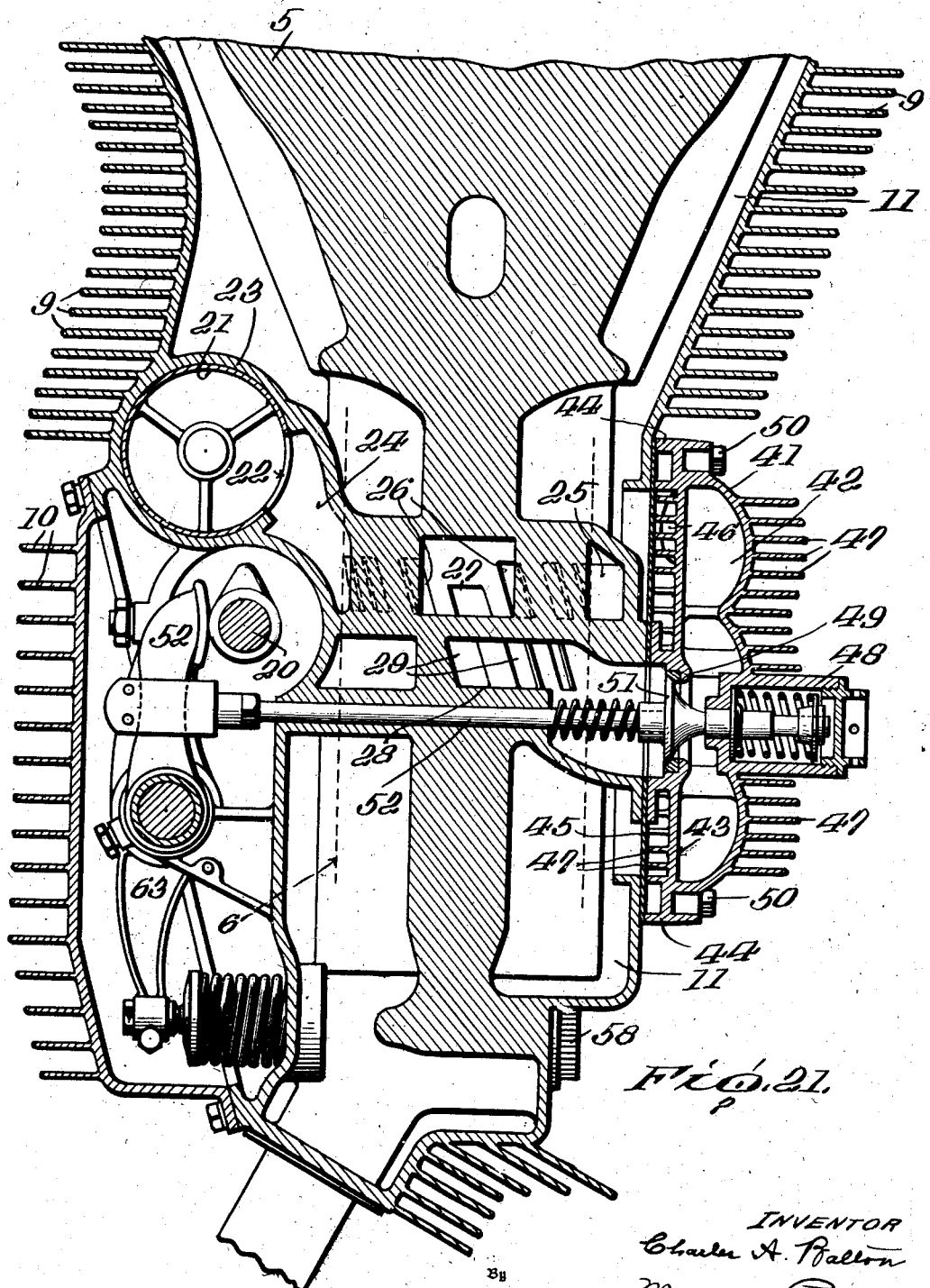

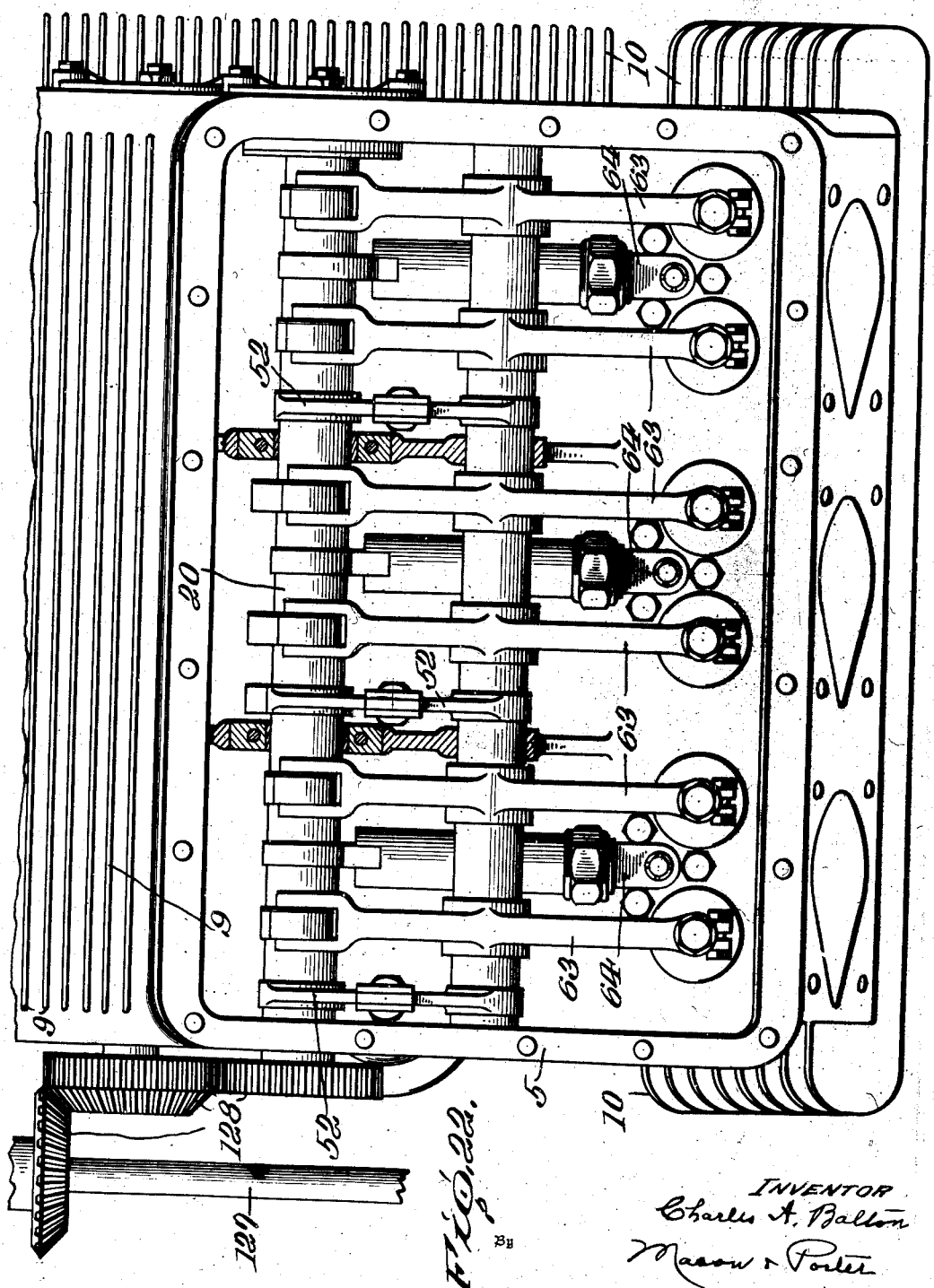

Aug. 19, 1941.  C. A. BALTON  2,252,914

DIESEL ENGINE

Filed Sept. 11, 1939  12 Sheets-Sheet 12

INVENTOR
Charles A. Balton
By Mason & Porter
ATTORNEYS

Patented Aug. 19, 1941

2,252,914

UNITED STATES PATENT OFFICE 2,252,914

DIESEL ENGINE

Charles A. Balton, Buffalo, N. Y., assignor to Trans-America Aircraft and Motor Corporation, Tonawanda, N. Y., a corporation of New York Application September 11, 1939, Serial No. 294,381

22 Claims. (Cl. 123—65)

This invention relates generally to certain new and useful improvements in internal combustion engines, and primarily seeks to provide a novel full Diesel engine structure designed to operate on the two stroke cycle and which is particularly adapted for use as an aircraft engine of the inverted, in-line type.

Heretofore, much difficulty has been encountered in producing two cycle Diesel engines which would be satisfactory for use in aircraft. One of the principal objections has been the high weight-power ratio of engines of known form which rendered them too heavy and cumbersome for the use stated. This was brought about by the necessity for using heavy structural parts in order to withstand the stresses developed due to the very high compression ratios essential to secure ignition of the injected fuels in operations under the full Diesel principle. Another objection present in engines of known forms has been the inefficiency in scavenging due to improper handling and injection of the scavenging air. Another objection has been presented by loss of efficiency in pre-combustion chambers due to the impossibility of properly scavenging such chambers during operation.

Also, in previously known engines, the desired compactness of structure could not be obtained due, in part, to improper attempts at provision of suitable cooling systems, a suitable liquid cooling system requiring too much added equipment, and engines relying solely upon the air cooling principle being so bulky as to offer too much resistance to movement through the air.

The above mentioned and other difficulties experienced in previously known engines have been overcome through the development of the structural features and equipments herein disclosed. Therefore, an object of the invention is to provide a novel inverted in-line engine structure particularly adaptable for use in aircraft and which operates on two stroke Diesel cycle.

Another object of the invention is to provide an engine of the above mentioned character in which each piston is provided with a diametrical rib-like projection extending in the direction of the axis of the piston and formed to provide a pre-combustion chamber, and adapted to be received into and substantially fill a recess in the cylinder head as the piston approaches top dead-center position.

Another object of the invention is to provide an engine of the character described in which the combustion chamber bearing projection on each piston is provided with a recessed chamber, the walls of which have a plurality of orifices connecting the chamber with the air in the cylinder, said orifices being so disposed as to cause jets of air to impact in the chamber as the piston approaches top dead-center whereby the temperature of the air may be raised to a high degree without using abnormally high compression ratios.

Another object of the invention is to provide an engine of the character stated in which the pre-combustion chamber formed in each piston is connected to one or more air ducts adapted to register with associated scavenging ports during scavenging to effect thorough cleaning of burned gases from the pre-combustion chamber and to replace said burnt gases with fresh air, thereby increasing the efficiency of the engine.

A further object of the invention is to provide an engine of the character stated in which air is handled in two adiabatic stages, the first being a scavenging stage at pressures slightly above atmospheric, and the second being a supercharging stage in which the air is admitted to the cylinder following scavenging and under pressures approaching two atmospheres.

A further object of the invention is to provide an engine of the character stated in which the scavenging and supercharging air is handled in triple thermo-dynamic sequence including isothermal scavenging before the exhaust valve closes, adiabatic charging after the exhaust valve closes, and a diabatic supercharging following completion of scavenging.

A further object of the invention is to provide an engine of the character stated in which the air for supercharging is passed through an intercooler prior to admittance to the individual cylinder.

A further object of the invention is to provide an engine of the character stated in which the air for scavenging and supercharging is handling by a two stage centrifugal pump, the first stage of which is connected to the scavenging ports of the engine through a rotary valve for low pressure scavenging, and the second stage of which is connected to the intercooler and through said intercooler and individual poppet valves therein with the supercharging parts of the engine for controlling the admission of high pressure air for second stage adiabatic supercharging.

A still further object of the invention is to provide an engine of the character stated which is both air and liquid cooled in a novel manner.

A still further object of the invention is to provide an engine of the character stated in which the air cooling is effected through the medium of a plurality of heat dissipating fins disposed in a novel manner, and the liquid cooling is effected through the use of a full jacketed type of engine structure in which a liquid coolant is circulated under pressure within the engine itself, there being no auxiliary radiators used during normal operation of the engine.

A still further object of the invention is to provide an engine of the character stated in which the liquid coolant circulating system thereof is provided with a thermostatically controlled by-pass for diverting the flow of liquid coolant through a small auxiliary radiator, should the engine be operated in geographic areas having abnormally high atmospheric temperatures, in order to achieve a more efficient cooling.

A still further object of the invention is to provide an engine of the character stated in which the crankcase thereof is substantially sealed except for a breather pipe leading therefrom to the intake of the two stage air pump whereby any corrosive compounds formed in the crankcase as a result of operation will be drawn therefrom, thereby avoiding the formation of sludge in the crankcase.

A still further object of the invention is to provide an engine of the character stated in which the individual pistons are provided with removably mounted and interchangeable combustion chamber forming piston heads.

A still further object of the invention is to provide an engine of the character stated in which the pistons are full skirted and present a smooth surface to the cylinder walls, unbroken by piston pin apertures or the like.

With these and other objects in view which will more fully appear, the nature of the invention will be more clearly understood by following the description, the appended claims, and the several views illustrated in the accompanying drawings.

Figure 6:
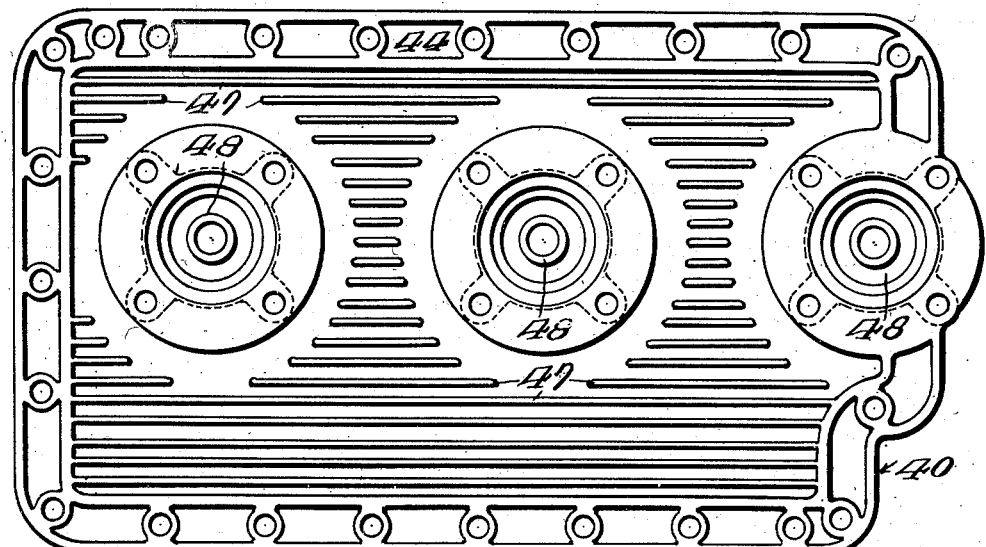
Figure 6 is an inner face view of the intercooler per se.
Figure 6A:
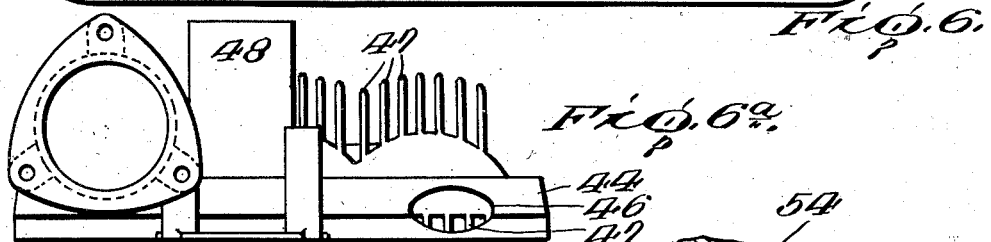

Figure 6ª is an end elevation of the intercooler per se.

Figure 7 is a diagrammatic fragmentary sectional view, showing the position of the piston during supercharging.

Figures 8, 9:
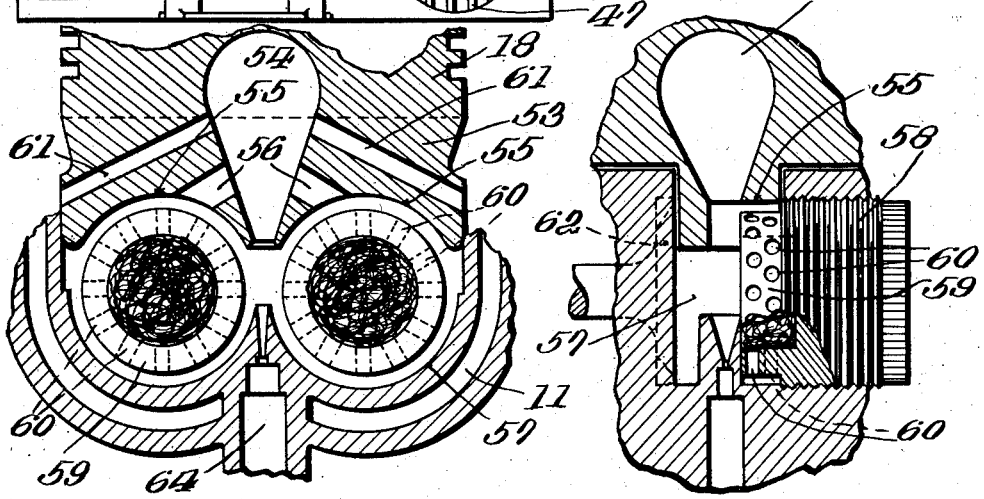

Figure 8 is a fragmentary sectional view showing the relation of one of the pistons to the cylinder head at the moment of injection.

Figure 9 is a fragmentary sectional view taken at right angles to Figure 8 and showing the location of the port plugs relative to the piston tongue.

Figure 10 is an axial section through a piston having one form of pre-combustion chamber casting secured thereto.

Figure 11 is a side elevation, partly in section, of the piston of Figure 10.

Figure 12 is a bottom plan view of the piston of Figure 10.

Figure 13 is a top plan view of the piston of Figure 10.

Figure 14 is a diagrammatic view illustrating the liquid coolant by-passing system.

Figures 15, 16, 17 and 18 are fragmentary sectional views illustrating various individually modified forms of pre-combustion chambers.

Figure 19 is a fragmentary sectional view taken at right angles to Figure 17.

Figure 20 is a cycle diagram showing the sequence of operation of the engine.

Figure 21 is an enlarged fragmentary vertical cross section taken through the axis of one of the supercharging air admitting valves.

Figure 22 is an enlarged fragmentary side elevation illustrating the arrangement of the injector nozzles and the supercharging air admitting valve actuating rockers.

Figure 23:
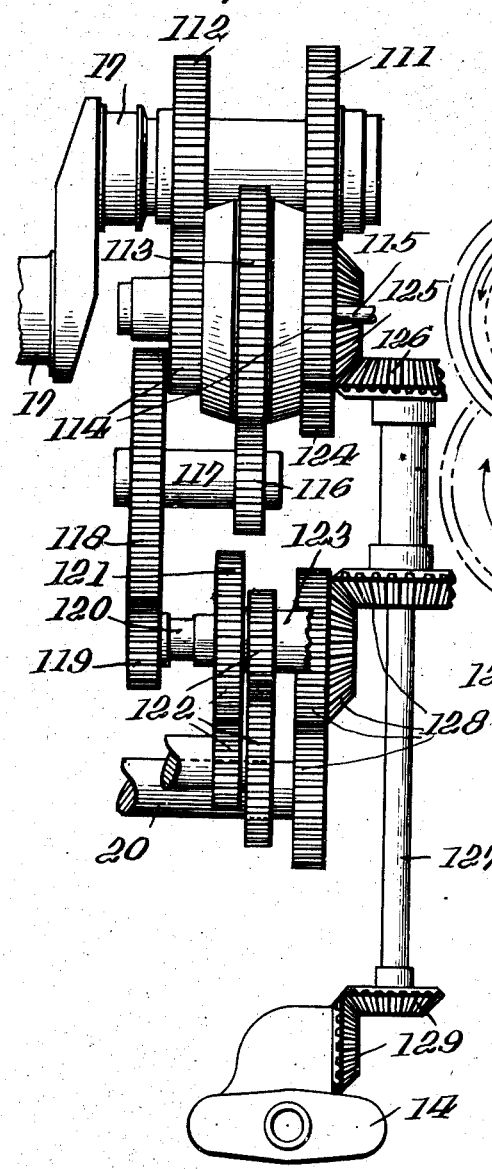
Figure 24:
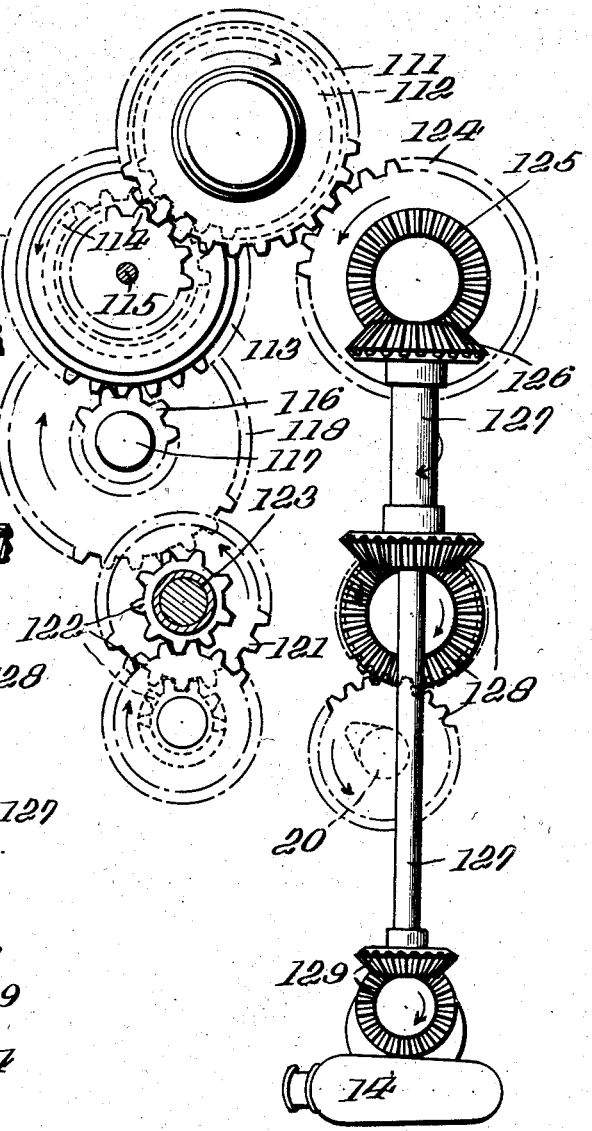

Figures 23 and 24 are somewhat diagrammatic views respectively illustrating, in side and end elevation, the driving devices for the air pumps, the coolant circulating pump, the rotary valve and the cam shaft.

In the drawings, the invention is illustrated as embodied in an inverted, in-line engine operating on the two stroke Diesel cycle.

The engine includes a cylinder block 5 having a plurality of cylinders 6 formed therein, three such cylinders being shown in the example of embodiment herein disclosed. The upper end of the cylinder block is shaped to form the lower half 7 of a crankcase, the upper half of the crankcase being formed by the usual crankcase cover 8. The outer surface of the crankcase is provided with a plurality of longitudinally disposed, radially extending, heat dissipating fins 9 integrally formed therewith. Similar heat dissipating fins 10 are formed integral with the cylinder block 5 on one side and the front and rear ends thereof, the other side of the cylinder block being without fins.

The cylinder block 5 and the complete crankcase 7, 8 are provided with a full jacket 11 adapted to receive a liquid coolant. The coolant receiving jacket 11, it should be noted, completely jackets the cylinders, the cylinder head, and the crankcase to thereby provide a uniform distribution of heat throughout the entire engine. This uniformity of heat distribution has been found desirable in order to prevent sludge formation such as would be encountered in the absence of an efficient jacketing of the nature stated, and means are provided for extracting from the crank case during operation of the engine vapors likely to present the problems of sludge formation, as will be hereinafter more fully described.

A gear housing 12 is fitted to the forward end of the crankcase 7 and rotatably supports the splined end of a propeller shaft 13 which projects axially therethrough.

A liquid coolant circulating pump 14, preferably of the centrifugal type, is secured on the rear face of the engine adjacent the lower end thereof, and is adapted to be positively driven by a suitable connection to a rotating part of the engine. The discharge side of the pump 14 is connected to the rear end of the cylinder block adjacent the lower end thereof by a flow pipe or other conduit 15, and a return pipe 16, having its upper end connected to the coolant jacket at the rear end of the crank cover 8 and its lower end connected to the intake of the pump 14, provides the necessary connection of the pump intake with the coolant circulating jacket 11 to complete the continuity of the cooling circuit. The flow of the liquid coolant during operation of the engine is from the rear of the engine to the front, and from the bottom to the top. Along the top of the engine, the flow is from the front of the engine to the rear where the coolant enters the pipe 16 and is directed by it to the pump for recirculation.

A crank shaft 17 is rotatably supported by the crankcase 7 and is operatively connected to the plurality of pistons 18 through the medium of the usual connecting rods 19. The engine is also provided with the usual cam shaft 20.

A rotary valve 21, having a plurality of valve ports 22, is rotatably mounted within a rotary valve casing 23 extending along one side of the engine. The casing 23 is in open communication with the cylinders 6 through the medium of short conduits 24 in Figure 21 joining the valve casing with a scavenging manifold 25 associated with and encircling each cylinder. Within each scavenging manifold 25 and passing through the respective cylinder walls are provided a plurality of circumferentially spaced scavenging ports 26 for admitting scavenging air to the cylinders. Within each scavenging manifold is also provided a pair of diametrically opposed ports 27 or cylinder wall passages for admitting scavenging air to the pre-combustion chamber formed in the particular cooperating piston, in a manner to be more fully described hereinafter.

The cylinder block 5 is provided with a plurality of air ducts 28 formed therein and disposed in a plane slightly below the plane of the scavenging manifolds 25. Each duct 28 communicates with the interior of a cylinder through a plurality of supercharging ports 29 for a purpose to be hereinafter described.

Figure 5:
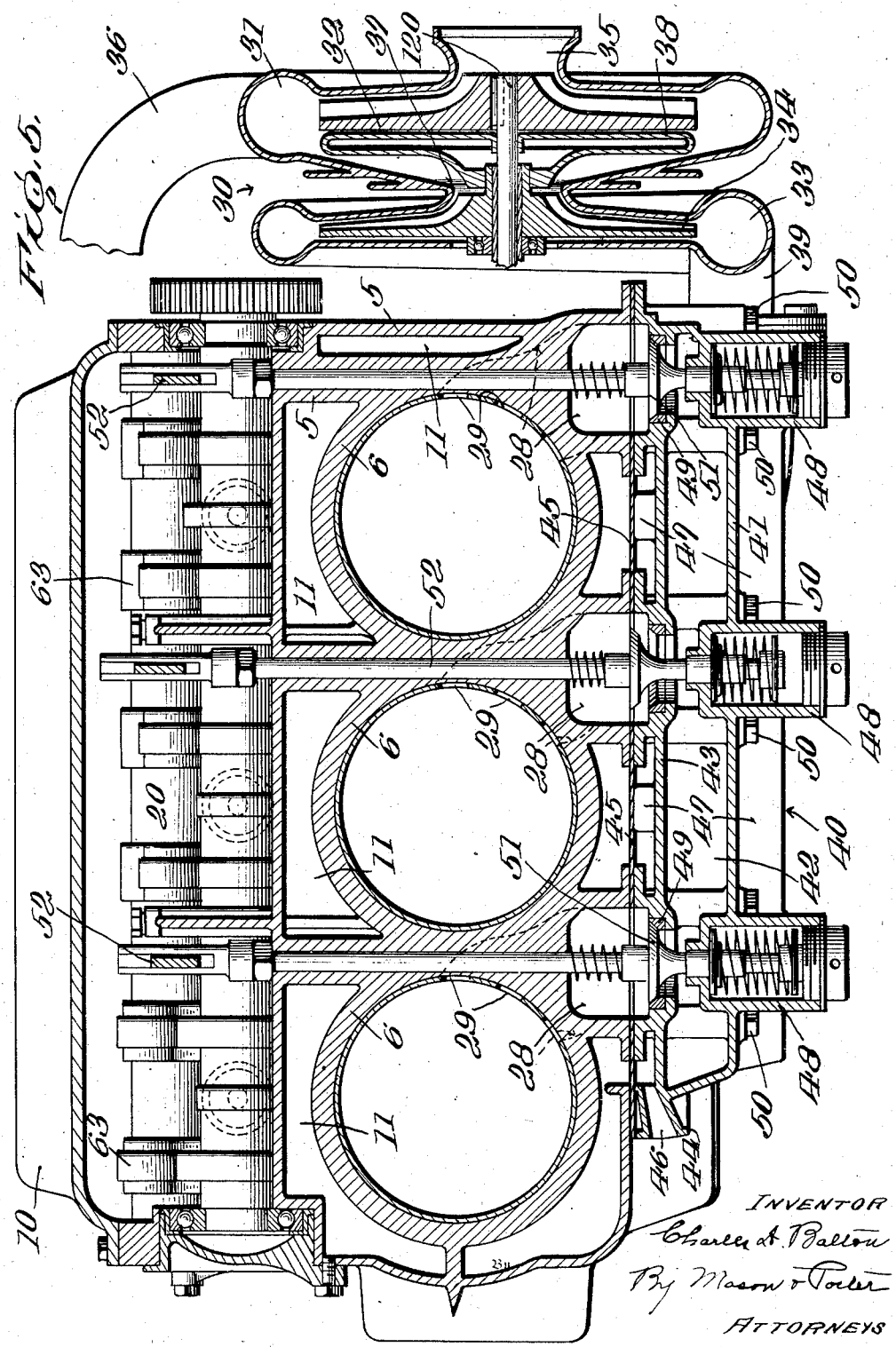
Figure 5 is a somewhat diagrammatic horizontal section illustrating the two stage pump and the connection thereof with the flow controlling valves, the section taken generally on the line 5—5 of Figure 4.

An air pump 30, preferably of the centrifugal type, is secured to the rear end of the engine near the bottom thereof, and includes a low pressure stage 31 having an impeller 32, and a high pressure stage 33 having an impeller 34. Air is drawn into the low pressure stage of the pump through a central air intake bell 35. Most of the air drawn into the low pressure stage is directed therethrough and discharged into a relatively large duct 36 connecting the low pressure involute with the rotary valve casing 23. See Figure 5. The remainder of the air is directed through a Venturi duct 37 into the center intake of the high pressure stage 33. The Venturi duct 37 is provided on its outer surface with a plurality of spaced annular heat dissipating fins 38 which effect a cooling of the air as it enters the high pressure stage of the pump. The air entering the high pressure stage 33 has its pressure increased therein to a degree approaching two atmospheres and is discharged therefrom through a relative small duct 39.

The high pressure air duct 39 is connected to an inter-cooler element generally designated 40 secured to that side of the cylinder block not provided with heat dissipating fins (see Figs. 1, 3, 4, 5 and 6). The inter-cooler is employed to provide for a combined cooling and expanding of the air passing therethrough in order that the air may be admitted to the cylinders in a fully expanded thermodynamic state, and it includes a hollow casting 41. The hollow casting provides an air space or chamber 42 into which air is introduced through the high pressure duct 39. An inner plate or wall portion 43 of the casting opposes an opening in the jacketed cylinder block 5 and is held spaced from the block by the marginal flange portions 44 which surround said opening. A closure plate or gasket 45 is clamped between the flange portions and the block and serves as a closure for the block opening. The plate 45 is spaced from the wall portion 43 and is in heat exchange relation with the air freely circulating between it and said wall portion through the flange penetrating atmospheric air introducing and discharging ducts 46. Heat dissipating fins 47 project inwardly and outwardly from the casting 41. Valve supporting and guiding structures 48 are formed in the inter-cooler, one for each engine cylinder, and a valve seat 49 cooperates with each said structure and provides a passage through which air can pass from the interior of the inter-cooler through the respective inlet ducts 28. As the air passes through the inter-cooler, heat will be removed therefrom through expansion of the air and by dissipation through the fins 47 formed integral with the inter-cooling casting.

The inter-cooler, as a complete unit, is rigidly secured to the cylinder block 5 by a plurality of bolts 50, the intermediate hollow portion of the inter-cooler being additionally supported through the use of spacing elements formed between the plate 43 and the plate 45.

The admission of high pressure air to the cylinders through the supercharger ports 29 is controlled through the use of valves 51, illustrated in this particular disclosure as of the poppet type, one such valve cooperating with each seat 49 for controlling passage of air through each duct 28 and being actuated through suitable connections 52 with the cam shaft 20.

The engine operates on the full Diesel principle and ignition and combustion is accomplished through the use of a novel piston-carried pre-combustion chamber and novel cylinder head structure. Each piston 18 is provided with a diametrical tongue-like projections 53 extending downwardly in an axial direction from the piston head (see Figs. 4, 7 and 8). The piston tongue 53 is provided with a chamber 54 extending upwardly and axially from the bottom edge thereof. It is to be noted that the chamber 54 is of uniform cross section when viewed in transverse section, and bulb shaped in longitudinal section. The upper extremity of the chamber 54 is disposed slightly above the plane of the piston head. The bottom edge of the piston tongue 53 is scalloped to provide two concave bottom edge portions 55, 55 which are symmetrically disposed relative to the intake orifice of the chamber 54. The piston tongue 53 is also provided with a pair of oppositely extending ducts 56 which connect the mid-portion of the chamber 54 with the respective bottom edge portions 55 to allow the passage of gases of combustion therethrough during ignition.

When in the operation of the engine a given piston approaches the top dead-center position, its tongue 53 is received into a recess 57 provided in the cylinder head, and forming, in conjunction with the piston tongue 53, a combustion chamber.

One side of each cylinder head recess 57 is provided with a pair of port plugs 58 threadably engaged in the cylinder block. Each plug 58 is provided with an inwardly projecting annular portion 59 having a plurality of radially disposed orifices 60 formed therein. The orifices 60 permit a flow of air therethrough to the inner portion of each annulus 59 and effect a material increase in velocity of the air. The individual jets of air passing through the orifices mutually impact at a substantially common point. Thus the increased velocity of air passing through the orifices plus the effect of mutual impact of the individual jets raises the air to a materially higher temperature than would result from conventional compression of the air. It may be found desirable to use a metallic wool, such as copper wool, in each annulus 59 which would glow due to the rise in temperature and effect a flashing of the cylinder charge. The port plugs 58 in each cylinder are so disposed that when the particular piston reaches the top dead-center position the concave bottom edge portions 55 of the piston tongue are disposed in substantially concentric relation thereto and are spaced slightly therefrom in order to form an annular combustion cavity surrounding each plug.

Air ducts 61 extend through the piston tongue 53 from the diametrically opposite edges thereof, and extend into open communication with the chamber 54. These ducts 61 are adapted to register with the small scavenging ports 27 in order to effect proper scavenging of the chamber 54 and to substitute fresh air for the burned gases therein.

Each cylinder is also provided with an exhaust valve 62 operatively mounted in the cylinder head and located in the wall of the cylinder head recess 57 on the side opposite the port plug 58. Each exhaust valve 62 is actuated from the cam shaft 20 through the medium of suitable cam, rocker and tappet equipments generally designated 63.

Fuel is injected into each cylinder through a nozzle equipment 64 which preferably is positioned to inject fuel in an axial direction into the mouth of the piston chamber 54 as the piston approaches top dead-center position. See Figures 8 and 9.

In Figure 15 of the drawings there is illustrated a modified form of piston-carried tongue and combustion chamber arrangement in which the tongue which is similar to the piston tongue 53 above described, but does not include the air ducts leading to the chamber 54 for the specific scavenging of that chamber.

In Figure 16 of the drawings there is illustrated further modified form of piston-carried tongue and combustion chamber arrangement in which the tongue is similar to that described hereinbefore but does not include the air ducts leading to the chamber 54, nor are there included the previously mentioned inwardly extending port plugs.

In Figures 17 and 18 of the drawings there is illustrated a modified form of pre-combustion chamber in which said chamber is formed wholly within the piston and the axially extending piston tongue. In this particular form, the piston body 18 is provided with a diametrically disposed and axially extending tongue 65. The bottom edge portion of the tongue 65 is shaped to provide twin downwardly extending convexly arcuate end portions 66, 66. The end portions 66 are provided with a plurality of circumferentially spaced orifices 67 which may be radially positioned if desired but preferably are disposed to communicate more or less tangentially with arcuate portions 68 of a precombustion chamber 69 formed in the tongue 65 as shown in Figure 17. The pre-combustion chamber 69 is provided with a jet diverting slot 70 having an arcuate end portion 71 formed in one side wall thereof. An orifice 72 is formed in the opposite wall of the chamber 69 and is adapted to register with a laterally disposed injection nozzle 73 as the piston approaches top dead-center position. The upper end of the chamber 69 terminates in a laterally extending T-section 74 formed in the piston body slightly above the plane of the piston head. The chamber 69 is also provided with air ducts 75 communicating therewith from the diametrically opposed side edge portions of the piston tongue 65 and adapted to register with the small scavenging ports 27 of the respective cylinder as the piston approaches bottom dead-center position to thereby rid the chamber 69 of the gases of combustion and replace them with fresh air. See Figure 4.

In the above described form of pre-combustion chamber, as a given piston approaches the top dead-center position, the tongue 65 is received into the associated cylinder head recess 57, and the air confined in the space between the bottom edge portions of the piston tongue and the cylinder head recess is rapidly compressed to a high pressure and temperature. The temperature of the air is additionally raised by the flow thereof under the force of compression through the orifices 67 and the mutual impact of the orifice air jets within the chamber 69, thereby obtaining a temperature greater than would be achieved through conventional compression.

Figure 4:
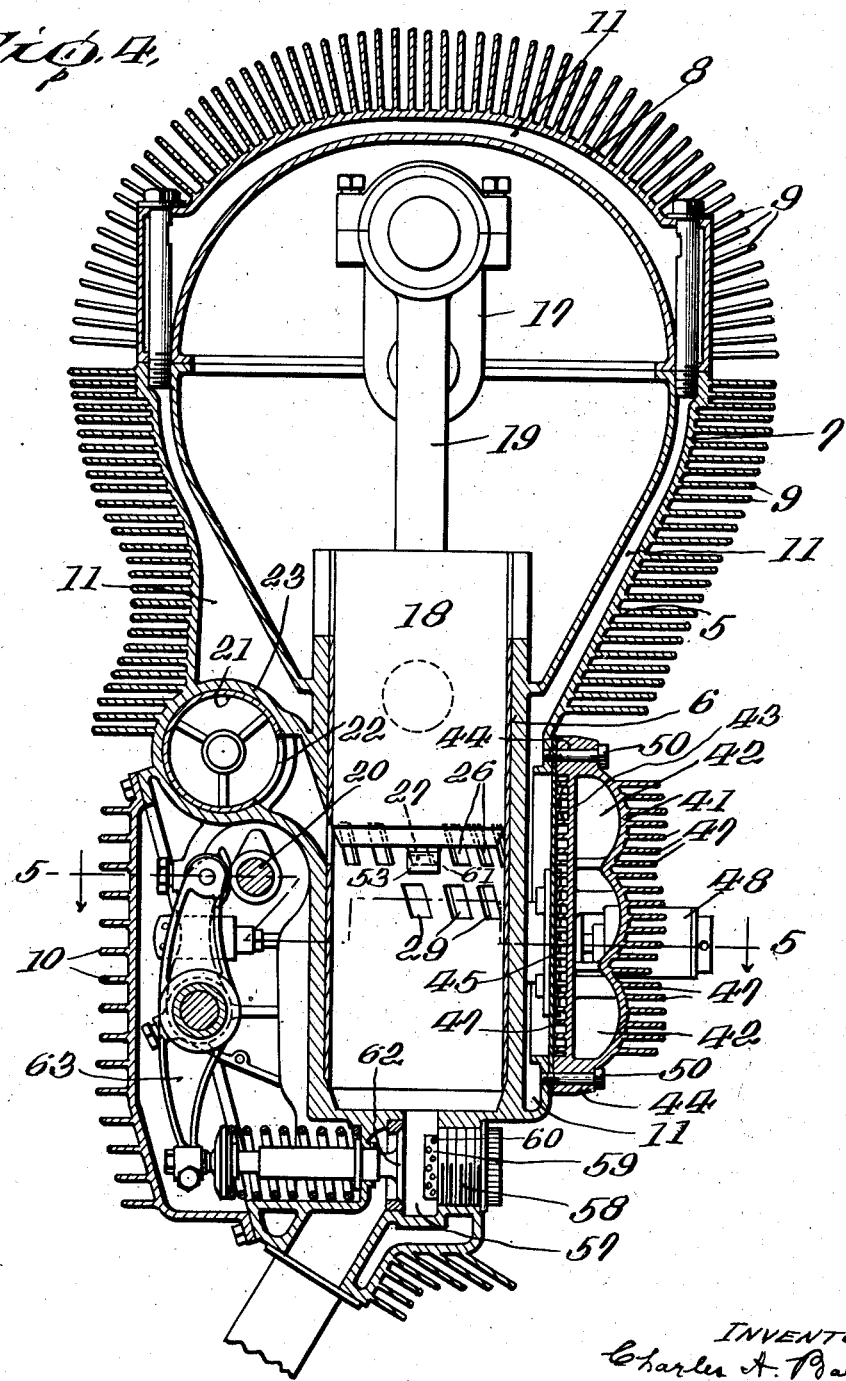
Figure 4 is a vertical transverse section taken on line 4—4 of Figure 1.

In Figure 19 of the drawings, there is illustrated an additional modified form of pre-combustion chamber which is somewhat similar to that disclosed in Figures 4, 16 and 17. In this particular form, the bulb-like chamber 54 is provided on one side with a relatively short arcuate jet diverting sector or wall portion 76 having a radius of curvature different from that of the remainder of the chamber and disposed in opposed relation to an injection orifice 77 extending through the opposed wall of the chamber. The orifice 77 is adapted to be disposed in register with a laterally disposed injection nozzle, such as was described in conjunction with Fig. 18, as the piston approaches the top dead-center position.

It is to be noted that through the use of the above described forms of piston-carried pre-combustion chambers it is only necessary to use a compression ratio of approximately 12½–13:1 in the cylinders in order to obtain a degree of heat in the pre-combustion chambers for proper ignition substantially equivalent to the heat obtained in such engines of present form having a compression ratio of 16.4:1. Therefore, the use of the considerably lower compression ratio in this engine enables the provision of a much lighter engine structure than has been practical heretofore and also provides for a lower weight-per-horse power ratio. The use of the lower compression ratio is also beneficial to the indicated B. M. E. P. (brake mean effective pressure).

The pistons 18 embrace certain novel features of construction and are of the blind type. They are assembled with the connecting rods and then the skirt is pulled up into place and bolted by four bolts to insure rigidity during operation.

Each piston 18 is a frabricated structure comprising four interchangeable units, namely, a skirt casting 78, a pre-combustion chamber crown casting 79, a wrist pin casting 80, and a piston ring collar 81.

The skirt casting 78 is cylindrical in form and has its wall section internally flared from head to base. The inner surface of the skirt is provided near the base with two sets of diametrically opposed heat dissipating fins 82 formed integral therewith. The inner surface of the skirt is also provided with four circumferentially spaced bolt-receiving lugs 83 formed integral therewith and disposed in spaced relation above the fins 82. A circumferential groove 84 is formed in the outer surface of the skirt near the base end thereof for receiving an oil-seal piston ring. The head of the skirt unit 78 is counterbored to provide a seat 85 for mounting the wrist pin casting 80.

The wrist pin casting 80 is a cylindrical casting having an outside diameter for snugly fitting the counterbored seat 85 formed in the skirt unit. The base of the wrist pin casting is adapted to fit into the seat 85 and be retained therein by means to be hereinafter described. The head 86 of the wrist pin casting is substantially flat, and is reinforced on its inner side by a plurality of spaced depending webs 87 formed integral therewith. Wrist pin bearings 88 are mounted on depending portions 89 of the wrist pin casting, said depending portions 89 being supplemented by a yoke-like web 90. Four axially extending internal extensions 91 merging into a like number of external depending sleeves 92 are provided within the wrist pin casting and are disposed to register with the skirt lugs 83 when the piston is completely assembled. The casting head 86 is provided with a circumferential recess 93 adapted to receive the inturned flange of the piston ring carrying collar. A centering ring 94 is formed on the outer surface of the casting head 86.

The interchangeably mounted crown casting 79 is provided with a selected one of the forms of diametrically disposed and axially extending combustion chamber tongues hereinbefore described. The crown casting is mounted on the head 86 of the wrist pin casting and may be provided with a counterbore 95 adapted to fit over the centering ring 94 on the head 86. It should be noted that the ring 94 may serve the additional function of sealing the counterbore 95 to thereby form a closed combustion chamber portion such as has been described as the T-section chamber portion 74 in conjunction with Figures 17 and 18.

The collar 81 is clamped in position by the crown casting 79 when the parts are assembled and it is provided with a plurality of circumferential piston ring mounting grooves 96 in which the usual piston rings 97 are mounted.

The entire four casting piston assembly is rigidly secured through the use of four tie bolts 98 extending through the crown casting, the mounting extensions 91 and sleeves 92, and the lugs 83 of the skirt. A suitable oil ring may be mounted in the groove 99 formed between the lower end of the collar 81 and the upper end of the skirt 78.

Several advantages are obtained through the use of pistons constructed in the manner described. Through the use of such construction, a full skirted piston is provided in which the skirt portion presents a smooth surface to the cylinder wall, unbroken by any wrist pin apertures or the like. Also, by having a removable crown casting, the forms of piston tongue combustion chambers are interchangeable at the option of the manufacturer without the necessity of changing the entire piston structure.

In some instances, when the engine is being operated in geographical areas having normally torrid weather, it may be found desirable to provide a small auxiliary radiator assembly connected in series with the liquid coolant circulating system, in order to more efficiently cool the engine. Such an auxiliary cooling assembly is disclosed in Figure 14 of the drawings. The small core radiator 100 is adapted to receive liquid coolant from the discharge orifice of a by-pass valve 101 through a conduit 102. The by-pass valve 101 is connected in series with the coolant return pipe 16 and is located near the upper end thereof. The by-pass valve includes a valve member 103 adapted to be controlled through the medium of a heat sensitive bellows 104 containing ethyl alcohol or the like. When the auxiliary cooling assembly is installed, the lower end of the coolant return pipe 16 is connected to the stem of a T-coupling 105. Then a short connector pipe 16ª has one end secured to one arm of the T 105 and its other end to the coolant circulating pump 14. The lower end of the radiator 100 is connected with the remaining arm of the T 105 by a pipe 106.

The auxiliary cooling assembly functions as follows: As the temperature of the liquid coolant in the engine rises, the bellows 104 will expand and unseat the valve member 103 in the by-pass valve to allow a portion of the coolant to flow through the pipe 102 to and through the radiator 100. The coolant re-enters the circulating system from the radiator through the pipe 106 and the T-coupling 105. By diverting a portion of the liquid coolant through the auxiliary radiator 100 while operating in torrid zones, sufficient additional cooling effect is obtained to maintain the temperature of the entire amount of coolant at the proper level for the most efficient operation.

Means are provided in this engine for withdrawing from the crankcase, all gaseous vapors which, if retained in the crankcase, would tend to form corrosive sulphurous compounds and sludge, to the detriment of the engine. The rear end of the crank case 7 is provided with a hand hole cover 107 removably secured thereto and provided with a downwardly extending projection 108 having an orifice formed therein. A crankcase breather tube 109 has one end secured within the projection 108 and its other end connected to the intake annulus 35 of the air pump 30. Thus as the engine is in operation, the reduced pressure at the air pump intake annulus will cause a flow of gaseous vapor from the crankcase through the breather tube 109 into the air pump. These vapors then pass through the engine and are exhausted into the atmosphere, thereby maintaining a relatively clean crankcase.

Figure 1:
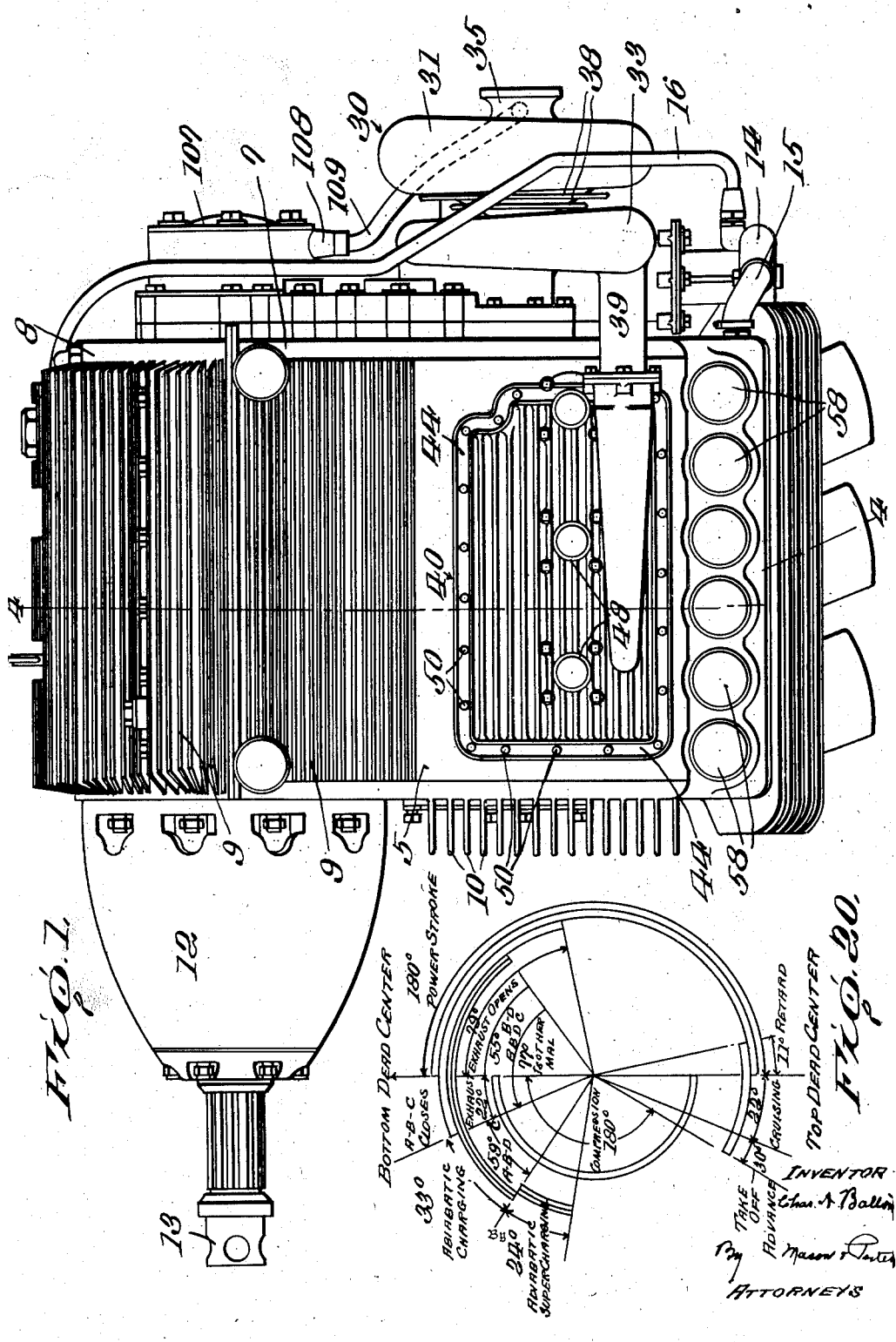
Figure 1 is a side elevation of an engine constructed in accordance with the invention.
Figure 2:
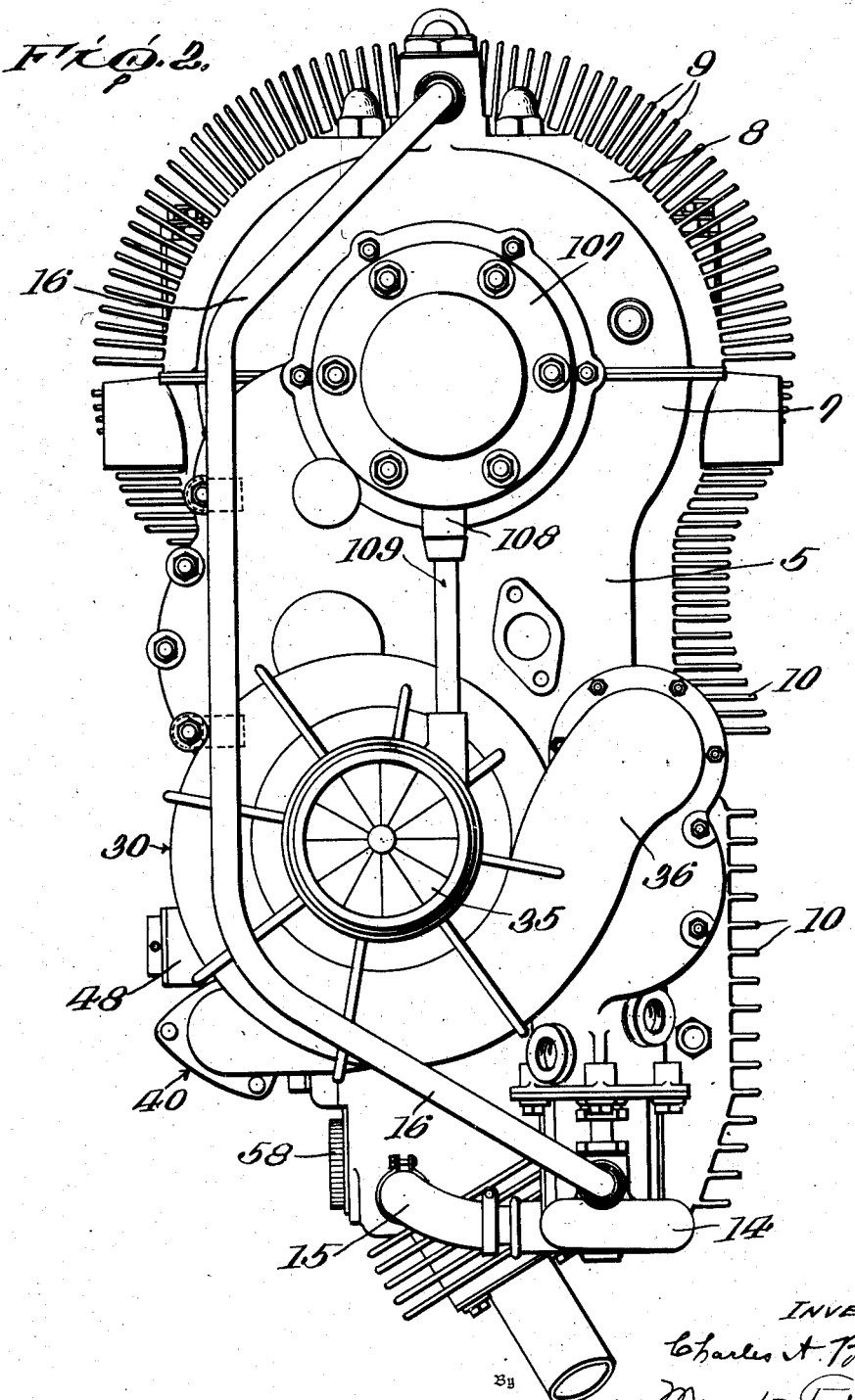
Figure 2 is a rear elevation of the engine.
Figure 3:
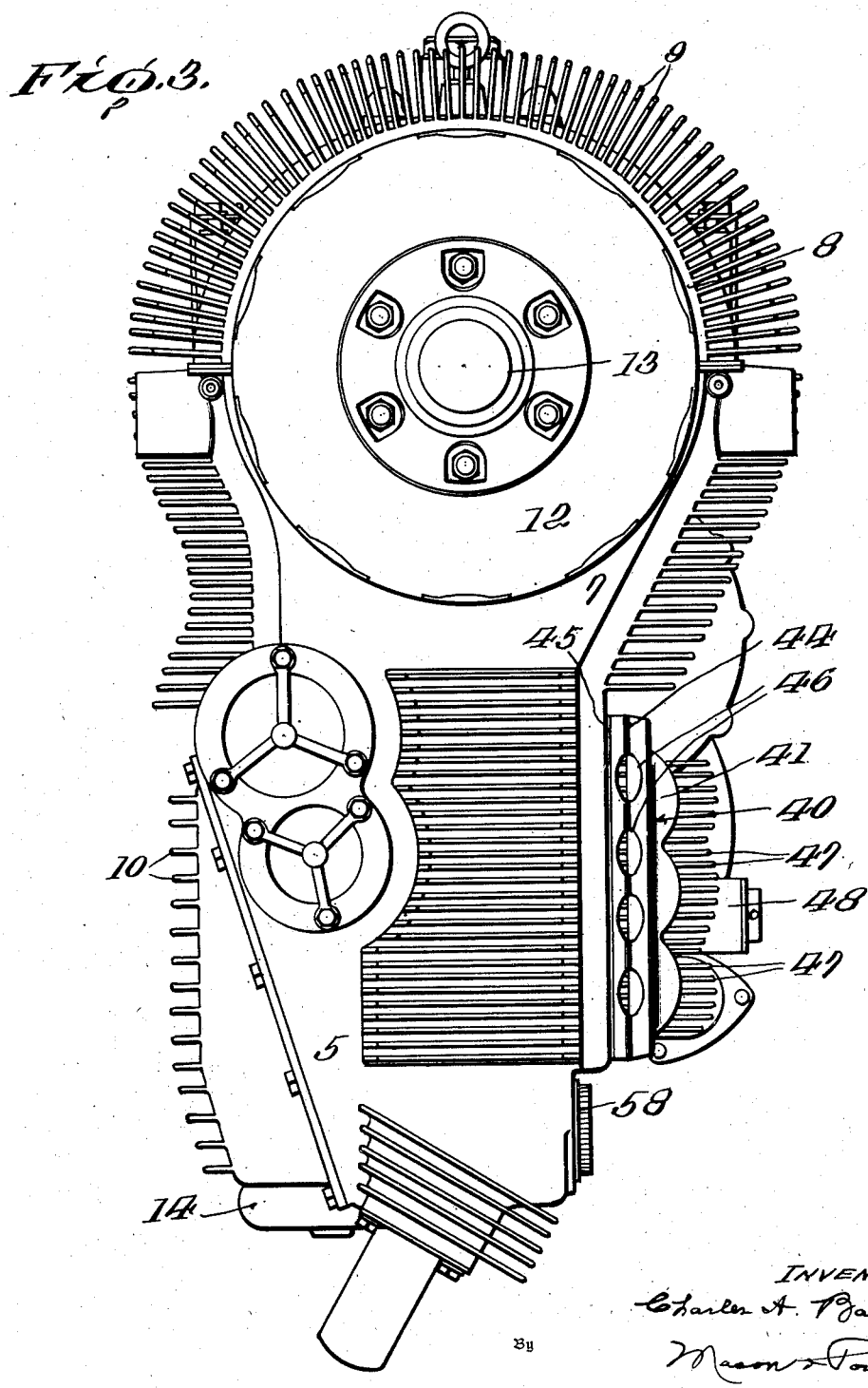
Figure 3 is a front elevation of the engine.

It will be observed by reference to Figures 2 and 14 of the drawings that the coolant return line preferably includes a resistance check valve generally designated 110. This valve serves to maintain the coolant under an eight pound pressure per square inch, and by this means the heat conductivity from cylinder walls to the outer skin of jacketing is increased.

In Figures 23 and 24 of the drawings I have somewhat diagrammatically illustrated driving connections for the air pumps 30, the coolant circulating pump 14, the rotary valve 21 and the cam shaft 20. The crank 17 carries a large driver gear 111 and a smaller driver gear 112 which are rendered selectively effective for imparting variable speed rotation to the driver gear 113 through the driven gears 114 which mesh with the gears 111 and 112 and are selectively connected in driving relation with said gear 113 by any suitable shiftable clutch devices generally designated 115. The gear 113 imparts its rotation to a driven gear 116 secured on a shaft 117 which also carries a large gear 118. The gear 118 meshes with a small gear 119 on the impeller shaft 120 of the first stage impeller 32 and drives that impeller below sound speed. The shaft 120 also carries a gear 121 which meshes with suitable intermeshing speed increasing gears 122 through which the rotation of the shaft 120 is imparted to the sleeve 123 on which the second stage impeller 34 is mounted, so as to drive that impeller above sound speed. The gear 111 also drives a gear 124. The gear 124 carries a bevel gear 125 which meshes with a like gear 126 on a vertical shaft 127 from which rotation is imparted to the cam shaft 20, through suitable gearing 128, and to the coolant pump 14, through suitable gearing 129.

By placing the valves 51 directly in the intercooler, the length of the air ducts 28 leading to the supercharge ports 29 is reduced and reheating of air within said ducts is minimized. These air ducts 28 also retain air when the ports 29 are closed by the pistons and this entrapment of air serves to dilute the gases of combustion near the end of the power strokes after the piston heads have cleared the supercharge ports 29, and thereby exhaust smoking is decreased and cleaner scavenging is facilitated.

It is preferred that all cooling fins be coated with material having a great affinity for infrared rays so as to facilitate heat dissipation outwardly.

In order to properly describe the operation of the engine, one complete cycle of operation in a single cylinder will be explained. For a convenient starting point, it will be assumed that the piston 18 is moving toward the bottom dead-center position on the power stroke. When the piston reaches a point 79° before bottom dead-center the exhaust valve 62 opens to begin the exhausting of the burned gases of combustion. At a point 55° before bottom dead-center, the scavenging ports 26 are uncovered by the piston, and the rotary valve 21 functions to admit scavenging air therethrough. It should be noted that the scavenging air from the low pressure stage of the air pump enters the cylinder at a pressure of approximately 9 pounds per square inch gage, thereby effecting a positive scavenging through the entire cylinder.

As the piston uncovers the scavenging ports 26 during its movement, the scavenging ducts 75 in the piston tongue 53 register with the small scavenging ports 27 to allow specific scavenging of the piston carried pre-combustion chamber.

When the piston reaches bottom dead-center the power stroke is completed and the compression stroke begins. After the piston moves 22° past bottom dead-center position the exhaust valve closes, but air still enters the cylinders through the scavenging ports 26. It should be understood that from the position 55° before bottom dead-center to the position 22° after bottom dead-center, the scavenging air is admitted in an isothermal state, that is, the air is entering the cylinder and the exhaust valve is open over this period, and from 22° to 55° past bottom dead-center the first stage of air induction becomes first stage adiabatic. Then, at 55° past bottom dead-center the scavenging ports 26 are again closed off by the piston, and the scavenging air is cut off from the ports by the rotary valve 21.

Thus it will be observed that from the point 22° after bottom dead-center to the point 55° after bottom dead-center the scavenging air entering through the ports 26 is actually charging air admitted under an adiabatic state since the exhaust valve had been closed at the beginning of that period and from that time on both the pressure and temperature of the air progressively increased. This air is now undergoing additional compression as a result of the piston travel towards top dead-center position.

At the point 55° after bottom dead-center the poppet valve 51 controlling the supercharge air from the high pressure stage of the air pump is opened to admit supercharge air into the cylinder through the supercharge ports 29 which have not been covered by the travel of the piston towards top dead center. This supercharge air is admitted to the cylinders under a pressure approximating two atmospheres, and enters the cylinders in an adiabatic state. When the piston reaches a point 79° after bottom dead-center, the supercharge ports 29 have been closed by the piston and the poppet valve 51 seated to close off the flow of air to the supercharge ports. Thus it will be observed that the supercharge air has been admitted to the cylinder through 24° of piston travel.

As the piston travels from a position 79° after bottom dead-center to the top dead-center position, the air in the cylinder is subjected to the usual compression. However, fuel injection should be controlled to begin at a point 30° before top dead-center for take offs, or 22° before top dead-center for cruising, and to end 11° after the top dead-center position. The power stroke is then beginning and the cycle is repeated.

It should here be observed that through the use of charging and supercharging air admitted to the cylinder in an adiabatic state, as differentiated from similar air admitted in an isothermal state, a more efficient cycle of operation is achieved thermodynamically.

It should be noted that the particular two stage air pump 30 illustrated handles 712 cu. ft. of air per minute, 500 cu. ft. of which is drawn from the lower pressure stage 31 for the isothermal scavenging and the first stage adiabatic charging. The remaining 212 cu. ft. is passed into the high pressure stage 33 for recompression which approaches two atmospheres and is used for the high pressure adiabatic supercharging.

After the high pressure air leaves the air pump, and before it enters the cylinders, it passes through the inter-cooler 40 where it is expanded to about one and one-half times its entering volume in order that the air may be admitted to the cylinders in a fully expanded state. This avoids any potential decrease in amount of supercharge air in the cylinders due to expansion upon admittance to the cylinder.

It will be readily apparent, by reference to the cycle diagram illustrated in Fig. 20 of the drawings, that by forming and controlling the engine so as to operate in cycles as described and diagrammatically illustrated, there will be no overlapping of scavenging and supercharging air in isothermal and adiabatic states respectively, nor will there be any gaps between scavenging and supercharging air. Therefore, by providing a smooth continuous sequence of air control and admission to the respective cylinders, a higher thermodynamic efficiency will be obtained than is possible of attainment in engines not operating under the above mentioned conditions.

Thus it will be seen that the invention provides a novel inverted in-line internal combustion engine operating on the two stroke Diesel cycle which is provided with a novel form of piston carried pre-combustion chamber; in which the cycle of operation includes isothermal scavenging, adiabatic charging, and adiabatic supercharging; which is provided with a combined air and liquid cooling system, and which is simple in design and rugged in construction.

In this disclosure broad references have been made to air pumps, but it should be stressed that advantages are obtained by utilizing superchargers which develop constant pressures as distinguished from pumps of a nature likely to set up pulsations.

While the principles of the invention are herein stressed as embodied in an aircraft engine of the inverted, in-line type, it will be obvious that these principles can as well be applied to engines which are not inverted and which are used for purposes other than in aircraft, and which have their cylinders arranged in radial or other not in-line forms.

It is of course to be understood that the details of structure and arrangement of parts may be variously changed and modified without departing from the spirit and scope of my invention.

I claim:

1. In a two cycle Diesel engine, a plurality of cylinders, a piston reciprocable in each cylinder, a crank shaft, pitmen connecting the pistons with the crank shaft, means for injecting fuel into air compressed in said cylinders, an exhaust valve in each cylinder, each said cylinder having a set of scavenging and charging air ports and a set of supercharging air ports opened and closed by movement of the pistons, means for opening each exhaust valve before the associated piston uncovers the scavenging and charging ports on its power stroke and for closing said valve before said piston closes these ports on its compression stroke, means for forcing air through said scavenging and charging ports at low pressure while said exhaust valves are open and the respective pistons uncover these ports, and means for immediately thereafter forcing supercharging air through the supercharging ports whereby there will be no overlapping of scavenging and supercharging air in isothermal and adiabatic states respectively and no gaps between scavenging and supercharging.

2. An engine structure as defined in claim 1 in which a rotary valve controls the admission of air through the scavenging and charging ports, and a poppet valve controls the admission of air through each set of supercharging ports, and in which a single constant pressure pump delivers air to all said ports, at low pressure to the scavenging and charging ports, and at high pressure to the supercharging ports.

3. An engine structure as defined in claim 1 in which the supercharging air is delivered to the supercharging ports through an intercooler chamber wherein it is expanded and cooled prior to passage through said supercharger ports.

4. An engine structure as defined in claim 1 in which a rotary valve controls the admission of air through the scavenging and charging ports, and a poppet valve controls the admission of air through each set of supercharging ports, and in which the supercharging air is delivered to the supercharging ports through an intercooler chamber wherein it is expanded and cooled prior to passage through said supercharger ports, said poppet valves being mounted in said intercooler chamber.

5. In a two cycle Diesel engine, a plurality of cylinders, a piston reciprocable in each cylinder, a crank shaft, pitmen connecting the pistons with the crank shaft, means for injecting fuel into air compressed in said cylinders for a short interval before and after each respective piston reaches top dead-center, an exhaust valve in each cylinder, means for opening each valve from approximately 79° before the respective piston reaches bottom dead-center until approximately 22° after the respective piston passes bottom dead-center, means for delivering air at approximately 9 pounds pressure into each cylinder during the time the respective piston is passing from approximately 55° before bottom dead-center to approximately 55° past bottom dead-center, and means for delivering supercharging air at a higher pressure into each cylinder during the time the respective piston is passing from approximately 55° past bottom dead-center to approximately 79° past bottom dead-center.

6. An engine structure as defined in claim 5 in which the air delivering means includes a single two phase pump for delivering the low and high pressure air at constant pressures from its respective phases, and individual control valve means for controlling the flow of the low and high pressure air supplies respectively.

7. An engine structure as defined in claim 5 in which the supercharging air is delivered through an intercooler chamber wherein it is expanded and cooled prior to passage into the cylinders.

8. An engine structure as defined in claim 5 in which the air delivering means includes a single two phase pump for delivering the low and high pressure air at constant pressures from its respective phases, and individual control valve means for controlling the flow of the low and high pressure air supplies respectively, and in which the supercharging air is delivered through an intercooler chamber wherein it is expanded and cooled prior to passage through the supercharging air controlling valves, said last named valves being mounted directly in said intercooler chamber.

9. An engine structure as defined in claim 1 wherein is provided means for trapping a quantity of supercharging air outside each set of supercharging ports as the respective piston covers these ports to be available as said piston again uncovers these ports on its power stroke to dilute burnt gases and minimize smoking and facilitate scavenging.

10. In a two cycle Diesel engine, a plurality of cylinders, a piston reciprocable in each cylinder, a crank shaft, pitmen connecting the pistons with the crank shaft, means for injecting fuel into air compressed in said cylinders, an exhaust valve in each cylinder, means for delivering scavenging and charging air into said cylinders, means for delivering supercharging air into said cylinders, and an intercooler through which the supercharging air passes to the cylinders and in which it is expanded and cooled, said intercooler comprising a hollow relatively flat body lying substantially parallel the axes of the cylinders and spaced therefrom so as to present inner and outer, top and bottom and front and rear end surfaces for air cooling purposes.

11. In a two cycle Diesel engine, a plurality of cylinders, a piston reciprocable in each cylinder, a crank shaft, pitmen connecting the pistons with the crank shaft, means for injecting fuel into air compressed in said cylinders, an exhaust valve in each cylinder, means for delivering scavenging and charging air into said cylinders, means for delivering supercharging air into said cylinders, an intercooler through which the supercharging air passes to the cylinder and in which it is expanded and cooled, said intercooler comprising a hollow relatively flat body lying substantially parallel the axes of the cylinders and spaced therefrom so as to present inner and outer, top and bottom and front and rear end surfaces for air cooling purposes, and valves for controlling admission of the supercharging air mounted directly in the intercooler.

12. In a two cycle Diesel engine, a plurality of cylinders, a piston reciprocable in each cylinder, a crank shaft, pitmen connecting the pistons with the crank shaft, each said piston having a narrow tongue projecting from its free end in the plane occupied by the piston axis and extending from side to side of the piston, each cylinder having a combustion chamber forming recess for snugly receiving the respective piston tongue, each said piston having a precombustion chamber therein formed in part in its tongue and including a fuel receiving opening, an exhaust valve operable in each cylinder recess, and fuel injecting means directed into each recess for injecting fuel into the respective piston opening in said recess.

13. An engine structure as defined in claim 12 in which each cylinder includes a scavenging air admitting port opened and closed by piston movement, and in which each piston tongue has a scavenging duct therein opening through its side and registrable with the scavenging port for effecting a scavenging of the respective precombustion chamber.

14. An engine structure as defined in claim 12 in which each piston tongue has a plurality of small orifices therein communicating between the respective cylinder recess and precombustion chamber and through which air compressed in said recess rushes into said precombustion chamber in very high velocity impinging jets.

15. An engine structure as defined in claim 12 in which the opposed faces of each cooperating tongue and receiving recess are complementarily formed to provide between them two substantially cylindrical communicating combustion chamber portions each disposed at one side of the axis of the cylinder, and each said fuel injecting means and cooperating piston opening being aligned on the respective cylinder axis.

16. An engine structure as defined in claim 12 in which the opposed faces of each cooperating tongue and receiving recess are complementarily formed to provide between them two substantially cylindrical communicating combustion chamber portions each disposed at one side of the axis of the cylinder, each said fuel injecting means and cooperating piston opening being aligned on the respective cylinder axis, and in which a hollow cylindrical igniter plug projects in spaced relation into each of said communicating combustion chamber portions, each said plug having a plurality of small orifices therein through which air compressed in said chamber portions rushes into the interior of each plug in very high velocity impinging jets.

17. An engine structure as defined in claim 12 in which each cylinder includes a scavenging air admitting port opened and closed by piston movement, and in which each piston tongue has a scavenging duct therein opening through its side and registrable with the scavenging port for effecting a scavenging of the respective precombustion chamber, and in which a hollow cylindrical igniter plug projects in spaced relation into each of said communicating combustion chamber portions, each said plug having a plurality of small orifices therein through which air compressed in said chamber portions rushes into the interior of each plug in very high velocity impinging jets.

18. In a two cycle Diesel engine, a plurality of cylinders, a piston reciprocable in each cylinder, a crank shaft, pitmen connecting the pistons with the crank shaft, means for injecting fuel into air compressed in said cylinders, an exhaust valve in each cylinder, valves controlling introduction of charging and scavenging air to said cylinders, casing structure providing coolant jacketing about each cylinder, the various valves and the crank shaft, a conduit for taking coolant from a high point in the jacketing and delivering it to a low point in the jacketing, means for circulating coolant directly through the jacketing and conduit under normal running conditions of the engine, an auxiliary heat exchange radiator, and thermostatically controlled means effective during conditions of abnormal heat to by-pass the coolant through said radiator.

19. In a two cycle Diesel engine, a plurality of cylinders, a piston reciprocable in each cylinder, a crank shaft, pitmen connecting the pistons with the crank shaft, means for injecting fuel into air compressed in said cylinders, an exhaust valve in each cylinder, valves controlling introduction of charging and scavenging air to said cylinders, a pump for forcing air into said cylinders through said valves, casing structure providing coolant jacketing about each cylinder, the various valves and the crank shaft, a conduit for taking coolant from a high point in the jacketing and delivering it to a low point in the jacketing, means for circulating coolant directly through the jacketing and conduit under normal running cnoditions of the engine, an auxiliary heat exchange radiator, thermostatically controlled means effective during conditions of abnormal heat to by-pass the coolant through said radiator, and means for withdrawing vapors from the space surrounding the crank shaft and delivering it into the intake to said pump.

20. An engine structure as defined in claim 1 in which means is provided for withdrawing vapors from the space surrounding the crank shaft and introducing them into the cylinders along with the air for scavenging and charging the same.

21. In a two cycle Diesel engine, a plurality of cylinders, a piston reciprocable in each cylinder, a crank shaft, pitmen connecting the pistons with the crank shaft, means for injecting fuel into air compressed in said cylinders, an exhaust valve in each cylinder, valves controlling introduction of charging and scavenging air to said cylinders, casing structure providing coolant jacketing about each cylinder, the various valves and the crank shaft, a conduit for taking coolant from a high point in the jacketing and delivering it to a low point in the jacketing, means for circulating coolant directly through the jacketing and conduit under normal running conditions of the engine, and means for constantly maintaining the coolant under a pressure of approximately 8 pounds per square inch.

22. An engine structure as defined in claim 1 in which a rotary valve controls the admission of air through the scavenging and charging ports, and a poppet valve controls the admission of air through each set of supercharging ports, and in which a single constant pressure pump delivers air to all said ports, at low pressure to the scavenging and charging ports, and at high pressure to the supercharging ports, said pump including a low pressure impeller and a high pressure impeller which receives air from the low pressure impeller and is rotated at a higher speed than said low pressure impeller.

CHARLES A. BALTON.